United States Patent
Suzuki et al.

[11] Patent Number: 6,013,684
[45] Date of Patent: Jan. 11, 2000

[54] METHOD FOR RECYCLING A CURED PHENOLIC RESIN INTO A MOLDED ARTICLE AND A VACUUM THERMAL INSULATOR OF THE MOLDED ARTICLE

[75] Inventors: Masaaki Suzuki, Osaka; Takayoshi Ueno, Hirakata; Hiroshi Onishi, Hirakata; Yukiyoshi Ono, Hirakata, all of Japan

[73] Assignee: Matsushita Electric Industrial Co., Ltd., Osaka, Japan

[21] Appl. No.: 09/262,837

[22] Filed: Mar. 5, 1999

[30] Foreign Application Priority Data

Mar. 6, 1998 [JP] Japan .................................. 10-055147
Apr. 7, 1998 [JP] Japan .................................. 10-094348

[51] Int. Cl.[7] .......................... C08J 11/04; C08K 11/00; C08L 61/04; E04B 1/74; C01B 31/00

[52] U.S. Cl. .............................. 521/40; 249/111; 252/62; 264/29.1; 264/29.3; 264/29.6; 264/101; 264/911; 523/129

[58] Field of Search ............................ 521/40; 264/29.1, 264/29.3, 29.6, 101, 911; 249/111; 252/62; 523/129

[56] References Cited

U.S. PATENT DOCUMENTS

4,321,154  3/1982  Ledru ........................................ 252/62
5,877,100  3/1999  Smith et al. ............................. 501/12

FOREIGN PATENT DOCUMENTS

01016639  1/1989  Japan .

*Primary Examiner*—Patrick D. Niland
*Attorney, Agent, or Firm*—McDermott, Will & Emery

[57] ABSTRACT

There is disclosed a method for recycling a cured phenolic resin by (a) heating a cured phenolic resin to form a thermal decomposition product having a residue, (b) separating said residue from said thermal decomposition product, (c) pulverizing said separated residue to obtain a carbide powder and molding said carbide powder alone or in combination with a binder into a molded article, and/or (d) gelling and drying said separated thermal decomposition product thereby molding it into a molded article. By the method, the present invention realizes efficient recycling of a cured phenolic resin which can become a massive waste into a useful material.

9 Claims, 5 Drawing Sheets

METHOD FOR RECYCLING A CURED PHENOLIC RESIN INTO A MOLDED ARTICLE AND A VACUUM THERMAL INSULATOR OF THE MOLDED ARTICLE

BACKGROUND OF THE INVENTION

The present invention relates to a technique for recovering and recycling a cured phenolic resin used in a printed board or the like for reuse as a raw material, more specifically to a molded article and a vacuum thermal insulator remolded from the recycled cured phenolic resin and methods for producing the same.

A cured phenolic resin produced by heating and curing a phenolic raw resin can serve as an excellent composite material if used in combination with paper or wood and, therefore, has been used massively in printed boards and building materials. The phenolic resin has been used in combination with paper components (fiber) to form a composite paper-phenolic resin composition.

However, such composite material can become massive wastes when products or articles using such material are junked or when defective goods produced at mass production are junked.

Under such circumstance, an effective technique has been sought for recovering or recycling such composite material from the aspect of resource savings.

In general, since such composite material essentially composed of a thermosetting resin is not molten or fused by heat, it is difficult to recover or recycle it into a raw material. The composite material is refractory to decomposition, which also hinders chemically converting it to a resin raw material or fuel.

This explains the current tendency toward wide use of heat generating when the composite material is burnt.

For effective use of the composite material as a raw material, on the other hand, a proposed method can be found in Japanese Laid-Open Patent Publication No. Hei 6-23751 which pulverizes a waste of a thermoplastic resin together with a waste of a cured resin into a powder and heats the powder under pressure to mold it into a remolded article. The remolded article thus obtained has been applied effectively in components of general use such as house construction material.

However, the above-mentioned conventional method can not solve the current serious demand of resource savings because it fails to show an efficient method for recycling the cured phenolic resin. Furthermore, the above-mentioned prior art gives only a method for reuse of the cured phenolic resin as the component and therefore has a drawback of having a poor additive value of recycling.

In view of the above situation, the present inventors made a vigorous study on the method for recycling such cured phenolic resin and developed an efficient recycling method of the cured phenolic resin preliminarily, which led to a discovery that the cured phenolic resin which may become a massive waste can be recycled and reused as a useful raw material.

More specifically, the object of the present invention is to provide an efficient method for recycling a cured phenolic resin used in a printed board, for example, thereby producing a molded article affording an excellent additive value. Another object of the present invention is to provide a high performance vacuum thermal insulator utilizing the molded article produced by the above-mentioned method.

BRIEF SUMMARY OF THE INVENTION

The present invention relates to a method for recycling a cured phenolic resin comprising the steps of:

(a) heating a cured phenolic resin to form a thermal decomposition product having a residue of the cured phenolic resin, (b) separating the residue from the thermal decomposition product, (c) pulverizing said separated residue to obtain a carbide powder and molding the carbide powder alone or in combination with a binder into a molded article, and/or (d) gelling and drying said separated thermal decomposition product thereby molding it into a molded article.

In a preferred mode of the present invention, the heating step (a) is performed in an atmosphere of a low oxygen concentration or in the presence of a solvent at a temperature of 300 to 1,000° C.

The pulverizing and molding step (c) can produce a vacuum thermal insulator by charging the carbide powder alone or in combination with a binder in a gas-tight vessel and vacuum-sealing the vessel by evacuation (the step (c')).

The gelling, drying and molding step (d) can produce a molded article by adding, to the thermal decomposition product, at least a condensing agent, a condensation catalyst and a solvent to form a wet gel and drying the wet gel to evaporate the solvent (the step (d')).

Charging the molded article in a gas-tight vessel and vacuum-sealing the vessel by evacuation can produce a vacuum thermal insulator.

In another preferred mode of the present invention, the wet gel is dried by an super-critical drying technique to produce an aerogel as a molded article in the step d'.

The above disclosure indicates that the present invention also relates to a vacuum thermal insulator comprising a residue contained in a thermal decomposition product of a cured phenolic resin, produced by the steps of:

(a) heating a cured phenolic resin to form a thermal decomposition product having a residue of the cured phenolic resin, (b) separating the residue from the thermal decomposition product, (c') pulverizing said separated residue to obtain a carbide powder, charging the carbide powder alone or in combination with a binder in a gas-tight vessel, and vacuum-sealing the vessel by evacuation.

The present invention also relates to a molded article comprising a thermal decomposition product of a cured phenolic resin, produced by the steps of:

(a) heating a cured phenolic resin to form a thermal decomposition product having a residue of the cured phenolic resin, (b) separating the thermal decomposition product from the residue, (d') adding, to said separated thermal decomposition product, at least a condensing agent, a condensation catalyst and a solvent to form a wet gel and drying the wet gel to evaporate the solvent. Charging the molded article in a gas-tight vessel and vacuum-sealing the vessel by evacuation can give a vacuum thermal insulator.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

As discussed above, the present invention relates to a method for recycling a cured phenolic resin comprising the steps of (a) heating a cured phenolic resin to form a thermal decomposition product having a residue of the cured phenolic resin, (b) separating the residue from the thermal decomposition product, (c) pulverizing said separated residue to obtain a carbide powder and molding the carbide powder alone or in combination with a binder into a molded article, and/or (d) gelling and drying said separated thermal decomposition product thereby molding it into a molded article.

Figure 1:
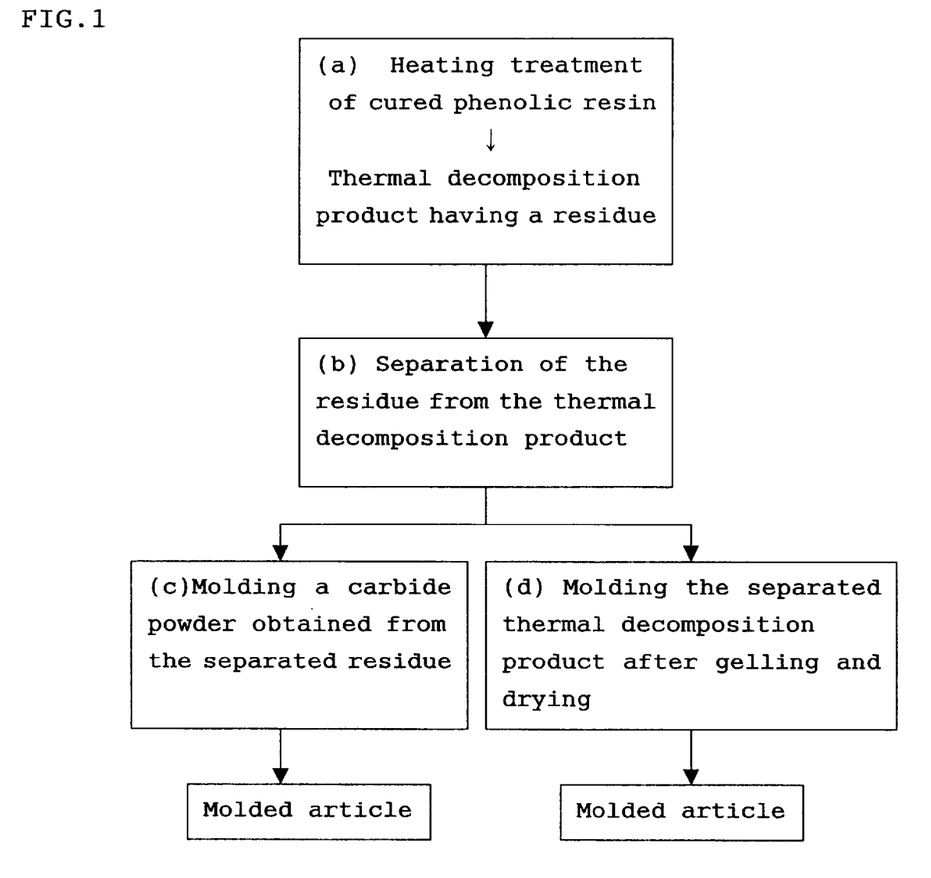
FIG. 1 is a chart illustrating the steps of the method for recycling a cured phenolic resin in accordance with the present invention.

Here, the recycling method of the present invention will be described with reference to FIG. 1 showing the steps for recycling the cured phenolic resin. As shown in FIG. 1, the most characteristic technical feature of the recycling method of the present invention is the heating step (a) where the cured phenolic resin is heated to form a thermal decomposition product containing a residue of the cured phenolic resin in order to reuse the residue as well as the thermal decomposition product per se.

However, since the residue is a solid carbide and the thermal decomposition product is a liquid of a phenolic derivative, such as phenol, methyl group containing phenol, or the like, the thermal decomposition product is separated from the residue or vice versa in the next separating step (b) in order to reuse each in the following step (c) or step (d). It is noted that the step (a) and the step (b) can be carried out at the same time in the recycling method of the present invention.

In the following, the present invention will be described more specifically referring to each step.

First, a thermal decomposition product containing a residue of a cured phenolic resin is produced by heating the cured phenolic resin in the first step.

The cured phenolic resin used here is not restricted to particular one and may be exemplified as a cured phenolic resin of common resol or novolak type. Any cured composite material or composition comprising a mixture of a phenolic resin with paper, wood, glass and/or ceramics may also be used as the cured phenolic resin.

Recycling the wastes of the paper-phenolic resin composition used in a printed board has become an important issue because of massive use of the composition. In recycling wastes of printed boards, preliminary removal of all the parts mounted on the printed board including copper lining is desired because this treatment improves recycling yield.

Furthermore, preliminary pulverization of the cured phenolic resin facilitates thermally decomposing the cured phenolic resin during the heating step. Pulverization of the cured phenolic resin can be achieved by using a general pulverizing procedure which applies an impact, compression, friction or shearing force using, for example, a crasher, mill or grinder. It is preferable from the aspect of shortening the heating time that the pulverized powder of the cured phenolic resin has a smallest particle size.

If the condition for pulverization is selected appropriately, a powder of a desired particle size can be obtained. Classification of particle may be combined if occasion demands. General procedure for classification uses a sieve or a wind power for selection.

According to the recycling method in accordance with the present invention, parts and copper lining of the composite material can be removed with ease after decomposing it by heating.

The heating method is not limited to a particular one and any method that can give a thermal decomposition product containing a residue can be applied. A thermal decomposition method in gas phase and a thermal decomposition method in liquid phase can be used.

The heating is performed at 300° C. or more because the phenolic resin starts to decompose and carbonize at this temperature. A more suitable heating temperature is 400° C. or more from the aspect of working efficiency.

A heating temperature may be not less than 1000° C. From the aspect of energy efficiency during heating, however, a heating temperature of 1,000° C. or less is sufficient and preferable. Further, from the aspect of avoiding possible complete carbonization of a carbide powder of the residue, a heating temperature of 800° C. or less is preferable. Complete carbonization of the carbide powder increases the thermal conductivity of the resultant carbide powder and the molded article obtained therefrom, making it unfit for use in a thermal insulator or the like.

The gas phase-thermal decomposition method decomposes the cured phenolic resin by placing it in a furnace.

This method can be done in the air, but since inflammation occurs at 500° C. or more, an atmosphere containing a low concentration of oxygen is preferable if the set temperature is high. Here, the definition of the atmosphere containing a low concentration of oxygen is an atmosphere containing 0 to 10% oxygen in the present invention.

Therefore, the gas phase-thermal decomposition method can be done by dry distillation or in an inert gas atmosphere such as nitrogen, argon or the like or in a vacuum.

The furnace used here is not limited to a particular one and an ordinary electric oven or atmospheric furnace can be used. The use of a dry distillation furnace or rotary kiln facilitates industrial treatment.

The liquid phase-decomposition method, on the other hand, decomposes the cured phenolic resin by placing a mixture of the cured phenolic resin with a solvent in a reaction vessel and heating the vessel to induce reaction.

In this method, any ordinary solvent exemplified as water, alcohol such as ethanol, glycol such as ethylene glycol, phenolic compound such as phenol, etc. may be used.

A hydrogen donor exemplified as tetralin (tetrahydronaphthalene), petroleum heavy oil, cooking oil, etc. may also be used in order to stabilize radicals generating upon decomposition of the cured phenolic resin. Hydrogen gas may be supplied additionally if occasion demands.

As the reaction vessel, a pressure-tight vessel should be used because the vapor pressure of the solvent increases upon heating.

Pressurization of the vessel with a gas such as nitrogen at heating is much effective for decomposition. In order to accelerate decomposition reaction, a decomposition catalyst such as iron oxide, copper oxide or the like may also be added.

In the next step (b), the thermal decomposition product containing a residue produced in the previous heating step (a) is separated into a liquid, that is, thermal decomposition product and a solid carbide, that is, residue.

The concrete separating procedure is as follows. In case where the heating treatment is carried out in gas phase, the thermal decomposition product is discharged in the gas state from the furnace. Then, if the gas is cooled and collected, the thermal decomposition product can be separated from the residue in the furnace. The cooling can be conducted by providing a cold trap by means of water cooling, air cooling or the like.

In the liquid phase-thermal decomposition method, the thermal decomposition product can be collected in the liquid state and, therefore, separated from the residue by filtration, washing, extraction or the like.

The resultant carbide residue is molded in the third step (c) and recycled. Alternately, the resultant thermal decomposition product per se is molded in the fourth step (d) and recycled.

Therefore, the presence of the third step (c) or the fourth step (d) in addition to the first step (a) and second step (b) suffices the method for recycling a cured phenolic resin in accordance with the present invention, but coexistence of the both steps (c) and (d) is more preferable from the aspect of efficient recycling of the cured phenolic resin.

When the third step (c) and the fourth step (d) are included, they may be performed separately.

The third step (c) for molding and recycling the residue will be described first.

The residue is pulverized and the resultant carbide powder is molded alone or in combination with a binder and recycled as a molded article.

For pulverization of the residue, the method as applied in the heating step (a) in order to pulverize the cured phenolic resin may be used.

The resultant carbide powder preferably has an average particle size of 500 $\mu$m or less. This is because when the carbide powder having this average particle size is charged into a vessel and molded, the space between the charged powder particles becomes smaller than the average particle size, which in turn renders the effect of thermal conduction by convection of gas almost negligible. This means that a vacuum thermal insulator with higher insulation performance can be obtained. Another effect is that the space between the particles becomes smaller than the mean free path of gas if those particles are placed in a vacuum-sealed vessel, thus producing a high insulating effect even if the degree of vacuum of the vessel is low.

From the aspect of easy handling of the carbide powder, on the other hand, the carbide powder preferably has an average particle size of 0.01 $\mu$m or more.

From another aspect of good insulating property even in a vacuum of a relatively low degree, it is preferable for the carbide powder to have an average particle size between 0.1 $\mu$m and 100 $\mu$m.

As discussed above, since incompletely carbonized carbide powder of the cured phenolic resin tends to have a lower thermal conductivity than completely carbonized carbide powder, the former is preferred as a filler for use in, for example, a vacuum thermal insulator. This tendency is prominent particularly with a paper-phenolic resin composition.

Therefore, a preferable carbide powder of the cured phenolic resin has an absorption spectrum of about 1,600 cm$^{-1}$ attributed to benzene ring on a spectral chart obtained by infrared spectroscopy.

The carbide powder can also be molded in combination with a binder.

The applicable binder is not limited to particular one and there are, for example, a cross-linking agent, liquid adhesive, a fine powder of a thermoplastic resin or a thermosetting resin, etc. may be used. More specifically, for example, a thermosetting liquid adhesive or a fine powder of phenolic resin, melamine resin or epoxy resin, or a fine powder of thermoplastic resin such as polyethylene, polypropylene, polystyrene or nylon (polyamide) may be used.

When the carbide powder is mixed with a binder, the mixing ratio of the two may be in a range that does not influence on the property such as insulating performance of the molded article. The mixing ratio of the binder is preferably low and, in concrete, 0.5 to 50%, for example.

The carbide powder or a mixture of the carbide powder with a binder may be molded using a conventionally known method. The resultant molded article can be porous and therefore can serve as a desirable thermal insulator. In the following, molding method of the carbide powder alone or in combination with a binder and therefore manufacturing method of a representative vacuum thermal insulator will be described.

Here, the carbide powder is charged alone or in combination with a binder in a gas-tight vessel and then the vessel is vacuum-sealed by evacuation to produce a vacuum thermal insulator. Alternately, a molded article may be produced preliminarily followed by charging it into a gas-tight vessel thereby forming a vacuum thermal insulator.

The gas-tight vessel is not limited to particular one and any one that can retain its internal vacuum in the vacuum-sealed state may be applicable. Examples of applicable vessel are molds of a metallic material such as steel iron, copper, aluminum or stainless steel or molds of inorganic material such as glass or porcelain.

A composite prepared by laminating, alone or in combination, fluorocarbon resin such as low air-permeable Teflon (polyethylene fluoride), vinyl alcohol resin such as ethylene vinyl alcohol copolymer resin, acrylonitrile resin such as polyacrylonitrile, vinylidene chloride resin, polyamide resin such as nylon or polyester resin such as polyethylene terephthalate may also be used.

Another preferred vessel is a multilayered laminate film of the above composite imparted with increased gas tightness by bonding a metal foil or depositing a metal, silica oxide or aluminum oxide onto each layer of the resin as exemplified above.

After charging the carbide powder alone or in combination with a binder into a gas-tight vessel, the vessel is vacuum-sealed by evacuation. In the use of the carbide powder alone, placement of the carbide powder in a gas-tight vessel after charging the powder into a air-permeable pouch or bag made of non-woven fabric or the like increases the workability.

In the use of a mixture of the carbide powder with a binder, the mixture can be molded into a molded article preliminarily by charging it in a dye followed by compression. Then, the molded article is placed in a gas-tight vessel and the vessel is vacuum-sealed by evacuation. When the powder is found to have fluidity during molding it into a molded article by compression, the powder can be pressure-molded by extrusion or injection while heating it if occasion demands.

The degree of internal vacuum in the vacuum thermal insulator varies by various factors such as the average particle size of the carbide powder as a filler, particle size distribution, etc., but 100 Torr or less is preferable and 10 Torr or less is more preferable. At this level, the vacuum thermal insulator has a thermal conductivity of 0.015 kcal/mh ° C. or less at room temperature and 0.01 kcal/mh ° C. under certain circumstance, thus exhibiting excellent insulating performance.

Drying the gas-tight vessel to remove water immediately before it is vacuum-sealed is effective. Further, drying the carbide powder or the mixture of the carbide powder and the binder is also effective.

In order to retain the insulating performance of the vacuum thermal insulator for long, it is better to place in the sealed vessel an adsorbent which can adsorb gas components mainly composed of air components such as nitrogen, oxygen, carbon dioxide and water vapor which generate inside the vessel.

As the adsorbent, conventionally used ones capable of adsorbing a gas physically and chemically can be used. An effective adsorbent for nitrogen, for example, is a vacuum getter such as a lithium, barium, titanium or zirconium system or a lithium-barium alloy.

For oxygen, it is better to use iron deoxidizer such as iron powder and iron (I) sulfuric anhydride, titanium deoxidizer, magnesium deoxidizer, or oxygen absorber such as salcomine cobalt complex.

For hydrogen and rare gas such as argon, the preferred adsorbent may be a fine powder of palladium for the former and a molecular sieve for the latter.

For carbon dioxide, a physical adsorbent such as molecular sieve, zeolite and active carbon may be used. Examples of chemical adsorbent may be inorganic compound of a metal, organic compound, soda ash, metal hydroxide such as sodium hydroxide, potassium hydroxide, calcium hydroxide, barium hydroxide and magnesium hydroxide, metal oxide such as calcium oxide and magnesium oxide, potassium carbonate, sodium carbonate, amine compound such as ethanol amine and solids bering free amino groups.

For water, conventionally known water adsorbents made of hygroscopic or water absorbing material such as zeolite, molecular sieve, calcium chloride, calcium oxide, calcium sulfide, magnesium sulfuric anhydride, phosphorous pentoxide and water absorbing polymer may be used.

For organic gas components, various adsorbents such as active carbon, molecular sieve, zeolite, silica and alumina may be used.

Next, the step (d) for gelling and drying the thermal decomposition product for molding it in a molded article will be described.

More specifically, a wet gel is produced by adding, to the thermal decomposition product, at least a condensing agent, a condensation catalyst and a solvent and the resultant wet gel is dried to evaporate the solvent which gives a molded article.

In this step, the liquid thermal decomposition product is reacted with a condensing agent in the presence of a solvent to form a wet gel having a network structure of gel skeleton secured by aggregated fine particles resulting from the reaction between the thermal decomposition product with the condensing agent. It is regarded that the fine particles are aggregated by addition reaction, condensation reaction and crosslinking reaction.

At that time, the mixture is heated in normal case in order to accelerate the reaction. The heating temperature varies according to the kind of solvent and may be in a range of 40 to 200° C., preferably 100° C. or less.

Selection of raw material, composition of the thermal decomposition product and reaction condition are key to controlling the physical properties of the resultant molded article, such as porosity, density and the like.

A suitable condensing agent is aldehyde compounds. Particularly preferred one is formaldehyde because of its good reactivity. In the presence of a condensation catalyst, the aldehyde compound reacts with the thermal decomposition product to add a methyl group to the decomposition product or is condensed to form a novolak with the thermal decomposition product by polyaddition condensation via a methylene bond.

Examples of aldehyde compound are formaldehyde, acetaldehyde, furfural, paraformaldehyde which produces formaldehyde upon heating, hexamethylenetetramine and the like.

As the condensation catalyst, basic catalyst and/or acidic catalyst can be used. Whereas the main action of the basic catalyst is to accelerate addition reaction of methyl group, that of the acidic catalyst is to accelerate polyaddition condensation via methylene bond.

In order to have a satisfactory wet gel from the thermal decomposition product, it is suited for the present invention to use a basic catalyst as the condensation catalyst for accelerating gelation reaction. Applicable basic catalysts may be exemplified as hydroxides of an alkali metal such as sodium hydroxide, carbonates of an alkali metal such as sodium carbonate, amine and ammonia all of which are conventional catalysts for use in manufacturing phenolic resins.

From the aspect of smooth progress of the subsequent drying step by enhancing the strength of the skeleton of the wet gel, additional aging treatment for crosslinking the resultant wet gel in the presence of an acidic catalyst added is also preferable, if occasion demands. For such acidic catalyst, known catalysts for use in manufacturing phenolic resins, such as sulfuric acid, chloric acid, phosphoric acid, oxalic acid, acetic acid, trifluoroacetic acid, etc. may be applicable.

The solvent is not limited to particular one and any solvent that can dissolve or disperse the thermal decomposition product may be applicable. Examples of applicable solvent are water, alcohol such as methanol, ethanol, propanol or butanol, glycol such as ethylene glycol or propylene glycol. Those solvents may be used alone or in combination.

From the above-mentioned aspect of smooth progress of the subsequent drying step by enhancing the strength of the skeleton of the wet gel, a phenolic compound may be added at gelling the thermal decomposition product. Examples of applicable phenolic compound are phenol, cresol, resorcin (1,3-benzendiol), and carboxylic phenol such as salicyclic acid or oxybenzoic acid.

As such, addition of at least a condensing agent, a condensation catalyst and a solvent to the thermal decomposition product and subsequent mixing and stirring of the mixture using a known technique can give a wet gel.

In the next step, the wet gel is dried to evaporate the solvent to form a molded article of a dry gel having many pores. At drying, natural drying, drying by heat, drying under reduced pressure, freeze drying or super-critical drying method may be used. In this step, careful selection of the method and condition for drying is very important in order to best eliminate possible shrinkage or breakage of the network skeleton of the wet gel by the drying stress generating in the pores of the network skeleton at evaporation of the solvent from the wet gel.

If a tight and strong skeleton has been secured for the wet gel by gelling and aging treatment, then natural drying, drying by heat or drying under reduced pressure may be applicable.

From the aspect of efficiency, however, freeze drying or super-critical drying method which would not generate drying stress in the pores is suited. The latter is particularly preferred because freeze drying has a risk of destroying the network skeleton during freezing. The molded article resulting from the above method is classified as aerogel.

The super-critical drying method can be done by various procedures as follows: drying the wet gel under conditions of a temperature and a pressure above the critical point of the solvent in the wet gel; substituting an extracting solvent for the solvent in the wet gel, followed by drying the wet gel under super-critical conditions of the extracting solvent; drying the wet gel by extracting the solvent in the wet gel under super-critical conditions of a mixture of the solvent with an extracting solvent.

As the extracting solvent for super-critical drying, water, carbon dioxide, alcohol such as methanol or ethanol, or carbonized hydrogen is used. Among them, carbon dioxide is preferred because it reaches its ultra-critical point at a relatively low temperature thereby preventing the gel skeleton from being modified, and it is easy to handle owing to its noninflammable property.

The wet gel to be dried may be controlled to the size of a desired molded article, but preferably should be molded after drying because of its possible shrinkage at drying. The wet gel may be dried as a block-shaped bulk. For rapid drying, the wet gel may be shaped to a granule, a powder or a fiber before drying.

The molded article obtained by drying the wet gel has many pores and can provide a high quality thermal insulator when charged into a gas-tight vessel. For producing such thermal insulator, the above-mentioned method for producing the vacuum thermal insulator in the step (c) may be used.

Now, a thermal insulator using the molded article having many pores obtained in the step (d) is described in detail.

The molded article in accordance with the present invention has a gel skeleton formed by aggregated fine particles which have been added, condensed and crosslinked by the reaction between the thermal decomposition product of the cured phenolic resin with a condensing agent. Therefore, the network of the gel skeleton has a porous structure with many pores. The molded article with such structure is low in density and high in heat insulation, and therefore can be used as a thermal insulator as it is.

When the molded article is a block-shaped bulk, then it can be used as a thermal insulator with no further treatment. When it is in the form of granule, powder or fiber, it is practical to charge the molded article in a vessel to retain its original form in order to cope with any arbitrary shape of a desired product.

Under certain use conditions, however, the molded article may be prone to decrease in physical property due to its hygroscopic activity because the gel skeleton of the molded article contains hydroxide group. The countermeasure against such inconvenience is to charge it in a vessel. The vessel may be made of any material that can retain the shape of the molded article, but the use of a material imparted with a moisture proof property is desirable because such material increases reliability of the resultant vessel.

In order to secure excellent insulating property for the thermal insulator in accordance with the present invention, it is desirable for the molded article to have a density of 500 $kg/m^3$ or less and an average pore size of 1 $\mu m$ or less. In order to realize ultra-high insulating property, a vacuum thermal insulator should be obtained by accommodating the molded article in a gas-tight vessel, followed by vacuum-sealing the vessel by evacuation.

When the last step (d) is omitted, a device so designed to enable simultaneous carbonization and pulverization may be used. Or, when the third step (c) is omitted, a device so designed to enable simultaneous thermal decomposition and pulverization may be used.

In the following, the present invention will be described more specifically by way of concrete examples but the present invention is not limited to only those examples.

First, the procedure for producing the thermal insulator through the third step (c) will be described in detail with concrete examples.

Figure 2:
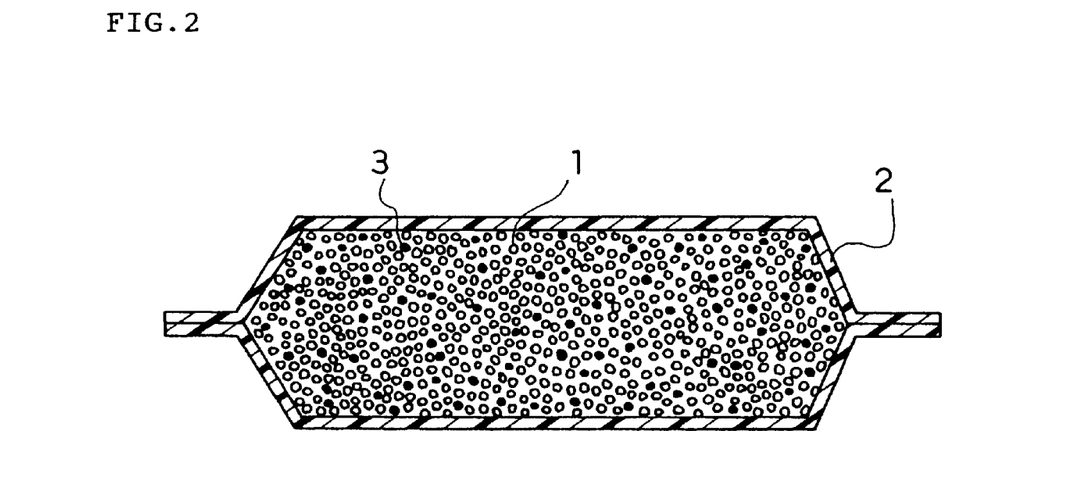
FIG. 2 is a cross-sectional view illustrating the vacuum thermal insulator in accordance with one example of the present invention.

FIG. 2 is the cross-sectional view of a vacuum thermal insulator in accordance with one example of the present invention. The vacuum thermal insulator has a structure where carbide powder 1 of phenolic resin from a cured phenolic resin is charged in a gas-tight vessel 2, which is then vacuum-sealed by evacuation. A gas adsorbent 3 is also sealed in the gas-tight vessel 2 in order to secure the reliability of the insulating property of the resultant thermal insulator for long, the adsorbent being dispersed in the carbide powder 1.

Figure 3:
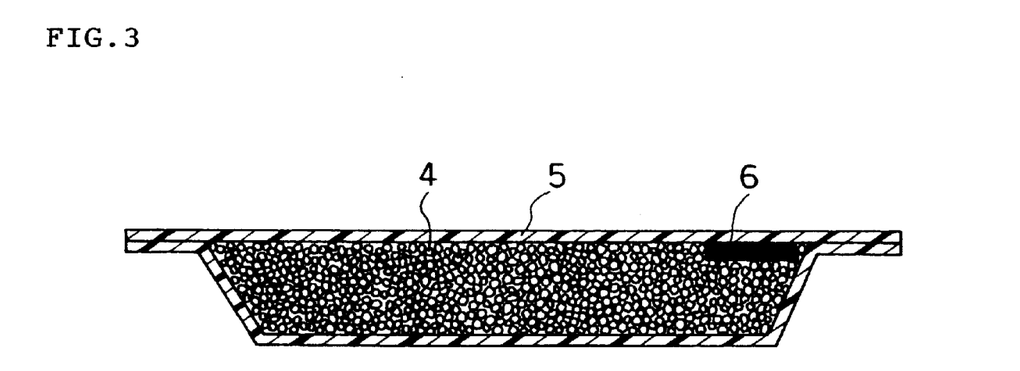
FIG. 3 is a cross-sectional view illustrating the vacuum thermal insulator in accordance with another example of the present invention.

FIG. 3 is the cross-sectional view of a vacuum thermal insulator in accordance with another example of the present invention. The vacuum thermal insulator has a structure where a molded article 4 produced from a carbide powder of a cured phenolic resin is charged in a gas-tight vessel 5, which is then injected with a gas adsorbent 6 for securing the reliability of the insulating property of the resultant vacuum thermal insulator, and vacuum-sealed by evacuation.

EXAMPLE 1

A printed board mainly composed of a paper-phenolic resin composition collected from used goods is roughly crashed with a crasher mill to separate non-metallic components from metallic components such as copper and other parts. The resultant cured phenolic resin of several mm was heated in the air at 400° C. for 1 hour and carbonized to obtain a residue of the phenolic resin, that is, carbide. The heated thermal decomposition product was discharged in the gas state and collected by a cold trap. The obtained residue was about 45% and the thermal decomposition product was about 50% of the charged phenolic resin.

The carbide was milled at 300 rpm for 12 hours using a ball mill and a carbide powder with a particle size of 300 $\mu m$ or less was obtained. In the infrared spectroscopic analysis of the obtained carbide powder, there was observed an absorption spectrum at about 1600 $cm^{-1}$ which was attributed to benzene ring. Namely, it was confirmed that the carbide powder was not carbonized completely.

The carbide powder thus obtained was filled in a non-woven fabric pouch and placed in a gas-tight vessel made of an aluminum foil-polyethylene terephthalate laminate film.

The vessel was vacuum-sealed using a vacuum packaging machine which gave a vacuum thermal insulator.

The vacuum thermal insulator thus produced is a panel having a vacuum degree of 0.1 Torr for the interior. The charge density of the molded article inside the insulator was about 500 kg/m$^3$.

Measurement of the thermal conductivity in the vacuum thermal insulator showed a value of 0.006 kcal/mh ° C. at an average temperature of 24° C., which value is about one fifth (1/5) the thermal conductivity of a known insulating material glass wool (about 0.03 kcal/mh ° C), demonstrating high insulating capacity of the vacuum thermal insulator.

EXAMPLE 2

A building material phenolic board was crashed into tips of several cm. The resultant cured phenolic resin was carbonized in a rotary kiln at 600° C. under gaseous nitrogen stream. The carbide of several mm thus obtained was crashed at 1,500 rpm using a crasher (Masscolloider manufactured by Masuko Industrial Co., Ltd.), and the resultant powder was classified using a sieve which gave a carbide powder having an average particle size of 100 μm or less.

The thermal decompositon product was transferred together with a gaseous nitrogen stream in the gas phase and collected in a vessel provided in the rotary kiln. In the infrared spectroscopic analysis of the obtained carbide powder, there was observed an absorption spectrum at about 1600 cm$^{-1}$ which was attributed to benzene ring.

The molding material used here is a mixture obtained by mixing, as a binder, a fine powder of nylon 12 with an average particle size of 25 μm and a melting point of 175 to 179° C. to the carbide powder at 2 wt %. The molding material was charged in a dye heated to 120° C. and pressed at 1 kg/cm$^2$ or less. Then, it was heated at 180° C. above the melting point of nylon as the binder and cooled to form a molded plate comprising a carbide powder of a phenolic resin. The molded plate had an average porosity of about 70%.

The molded plate thus obtained was placed in a gas-tight vessel made of a stainless steel foil-polyethylene terephthalate laminate film together with an adsorbent molecular sieve and the vessel was vacuum-sealed by evacuation which gave a vacuum thermal insulator.

The vacuum thermal insulator had a thermal conductivity of 0.01 kcal/mh ° C. at an average temperature of 24° C., which value is about one third (1/3) the thermal conductivity of the known insulating material glass wool (about 0.03 kcal/mh ° C.), demonstrating high insulating capacity of the vacuum thermal insulator.

EXAMPLE 3

A piece of a printed board mainly composed of a paper-phenolic resin composition was heated at 650° C. in a gaseous nitrogen atmosphere and carbonized to form a carbide of a phenolic resin in the same manner as in Example 2.

Then, using the same technique as in Example 2, the carbide was pulverized into a carbide powder having an average particle size of 100 μm or less. The carbide powder thus obtained was heated and dried at 120° C., and then charged into a gas-tight vessel in the form of box made of a stainless steel. The box was vacuum-sealed by evacuation in the same manner as in Example 1, which gave a vacuum thermal insulator box.

The heat flow quantity of vacuum thermal insulator box thus obtained was compared with that of a non-vacuum box. The result indicated a 5-fold superior insulating capacity for the vacuum thermal insulator box in accordance with the present invention compared to the non-vacuum box.

Comparative Example 1

A printed board collected from a waste was roughly ground in the same manner as in Example 1 and further pulverized into a powder with an omission of carbonization step. However, additional pulverization for 24 hours was necessitated for this powder due to insufficient pulverization.

Most of the powders thus pulverized were still large and collection yield of the powder having an average particle size of 300 μm or less by classification with a sieve was only 5% or less of Example 1.

Comparative Example 2

A carbide powder of a phenolic resin was produced in the same manner as in Example 1, except for heating the cured phenolic resin at 250° C.

Most of the carbide powders thus produced measured 1 mm or more in diameter due to insufficient pulverization. The collection yield of the powder having an average particle size of 300 μm or less by classification with a sieve was only 20% or less of Example 1.

Comparative Example 3

A molded article comprising a carbide powder of a phenolic resin was produced by compression molding a cured phenolic resin tip as used in Example 2 without any additional treatment. The resultant molded article had an average porosity of about 30% or less. A vacuum thermal insulator was produced in the same manner as in Example 2 using the molded article.

The vacuum thermal insulator thus produced had a thermal conductivity of 0.02 kcal/mh ° C. at an average temperature of 24° C., which value was lower than that (about 0.03 kcal/mh ° C.) of a known thermal insulator glass wool. However, the vacuum thermal insulator of Comparative Example 3 demonstrated far inferior insulating capacity to that of the vacuum thermal insulator of Example 2.

As discussed above, according to the method for recycling a cured phenolic resin in accordance with the present invention, the third step(c) can yield a high performance vacuum thermal insulator from a cured phenolic resin, such as printed board, which is much refractory to recycling, facilitating effective recycling of a waste.

Next, the procedure for producing a thermal insulator by the fourth step(d) in accordance with the recycling method of the present invention will be described.

Figure 4:
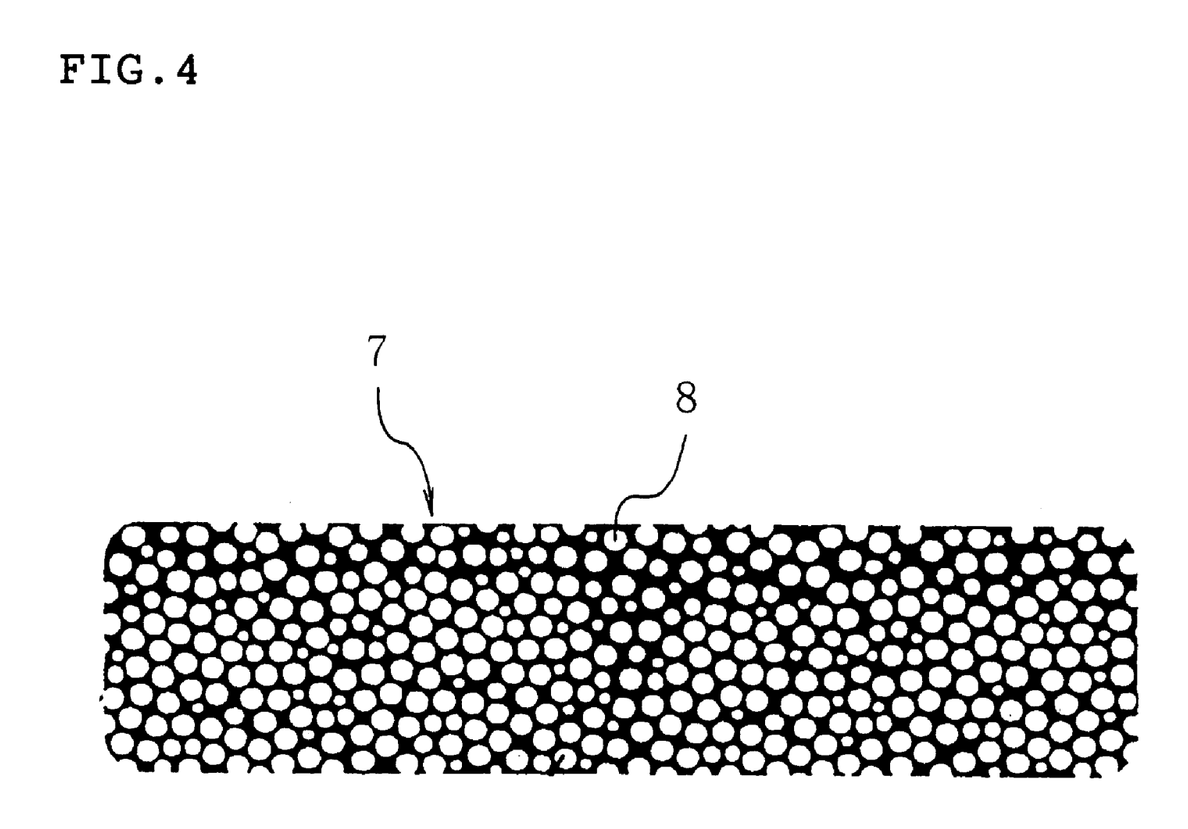
FIG. 4 is a cross-sectional view illustrating the fine porous bulk in accordance with another example of the present invention.

FIG. 4 illustrates a cross-section of a molded article (fine porous material) produced by the fourth step. A decomposed phenolic resin product was obtained by heating a cured phenolic resin. To the decomposed product thus obtained, at least a condensing agent, a condensation catalyst and a solvent were added and gelled to form a wet gel. The wet gel was shaped in block and dried to evaporate the solvent from the wet gel, which gave a molded article 7 of a dry gel (fine porous bulk).

The fine porous bulk 7 thus produced has a gel skeleton formed by three-dimensional aggregation of fine particles caused by addition reaction, condensation reaction and crosslinking reaction of the decomposed product of the phenolic resin with the condensing agent. The porous bulk 7 has a low-dense porous structure having many pores 8 which were formed upon evaporation of the solvent by drying.

Figure 5:
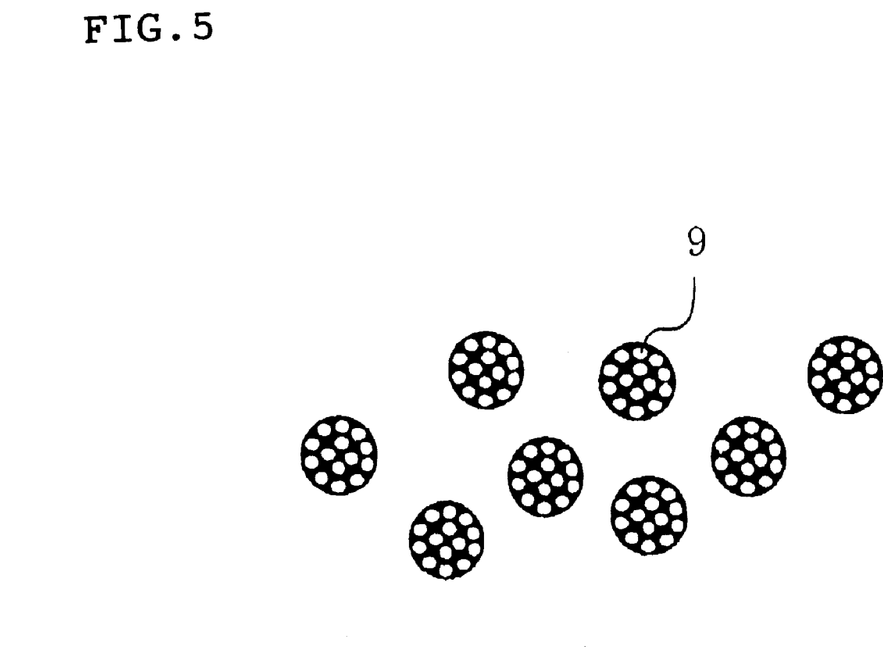
FIG. 5 is a cross-sectional view illustrating the fine porous powder in accordance with still another example of the present invention.

FIG. 5 shows a cross-section of another molded article (fine porous powder) in accordance with the present invention. A cured phenolic resin was produced following the step(d) in FIG. 1. In the last step(d), the wet gel resulting from gelation was granulated into beads and dried to form a molded article 9 of a powder (fine porous powder).

The molded article 9 is a low-dense dry gel having many pores. When it is used to form a thermal insulator, it should be charged in a vessel for retaining its original shape or molded into an arbitrary shape using a binder or the like.

Figure 6:
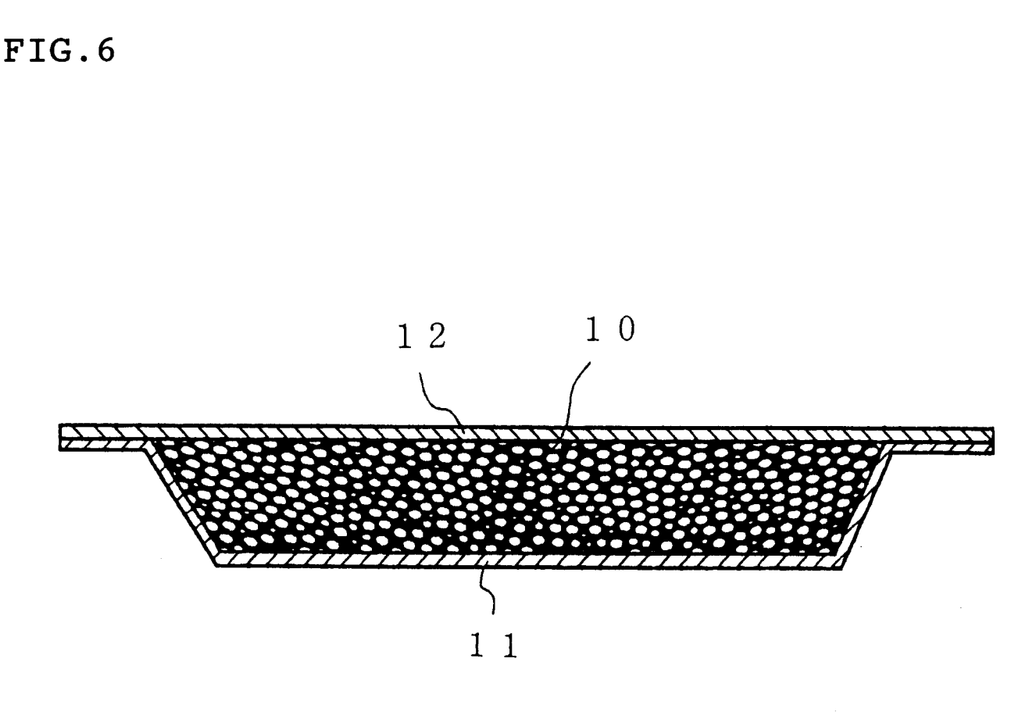
FIG. 6 is a cross-sectional view illustrating a vacuum thermal insulator utilizing the molded article in accordance with a further example of the present invention.

FIG. 6 shows a cross-section of a thermal insulator using a molded article (fine porous powder) in accordance with the present invention.

A molded article 10 (fine porous powder) formed from a cured phenolic resin was charged in a vessel 11 and the vessel is sealed with a lid 12 in order to retain the original shape of the molded article. In this way, a thermal insulator can be obtained. Using a gas-tight material, such as metal-thermoplastic resin film, for the vessel 11 and lid 12, the molded article was charged in the vessel 11 and the vessel was vacuum-sealed by evacuation using the lid 12, which gives a vacuum thermal insulator with excellent insulating capacity.

EXAMPLE 4

A printed board mainly composed of a paper-phenolic resin composition collected from a used article was roughly ground using a crasher mill and non-metallic parts were separated from metallic components such as copper. The pulverized cured phenolic resin of several cm was placed in an atmospheric furnace and heated for 1 hour at 600° C. in a gaseous nitrogen stream. The residue in the furnace was collected and the vaporized thermal decomposition product was cooled and collected, which gave a thermal decomposition product of a phenolic resin.

To 4 parts by weight of the thermal decomposition product, 5 parts by weight of a 37% aqueous formaldehyde solution as a condensing agent and 0.04 parts by weight of a basic catalyst sodium carbonate as a condensation catalyst were added together with 100 parts by weight of water as a solvent. After vigorous stirring at 60° C., the mixture was gelled at about 90° C. over 1 week. The resultant brown wet gel was placed in acetone containing an acidic catalyst trifluoroacetic acid for aging in order to accelerate crosslinking reaction between the particles of the wet gel. Then, the water as the solvent was extracted by substitution with acetone.

The resultant wet gel panel whose solvent has been substituted with acetone was sealed in a pressure-proof vessel. The vessel was injected with liquid carbon dioxide at 20° C. and then the temperature was elevated up to 45° C. in order to substitute the solvent with carbon dioxide in the super-critical state at about 90 atmospheric pressure. After releasing the pressure from the vessel, the wet gel was dried, which gave a molded article having many pores.

The molded article thus obtained was an aerogel having a density of about 250 kg/m$^3$ and an average pore size of about 40 nm. The molded article was panel-shaped and showed a thermal conductivity of 0.015 kcal/mh ° C. at an average temperature of 24° C., which value was about a half the thermal conductivity of the known insulating material glass wool (about 0.03 kcal/mh ° C.). As such, the molded article of Example 4 demonstrated excellent insulating capacity.

EXAMPLE 5

A printed board mainly composed of a paper-phenolic resin composition collected from a used article was roughly ground using a crasher mill and non-metallic parts were separated from metallic components such as copper. The pulverized cured phenolic resin of several mm was placed in a heat-proof vessel together with tetralin as a solvent and iron oxide as a catalyst and then heated at 430° C. for 1 hour at 20 atmospheric pressure of nitrogen. The residue was removed by filtration and a thermal decomposition product of the cured phenolic resin was collected.

To 3 parts by weight of the thermal decomposition product, 6 parts by weight of a 37% aqueous formaldehyde solution as a condensing agent, 0.05 parts by weight of a basic catalyst sodium carbonate as a condensation catalyst and 2 parts by weight of resorcin as a phenolic compound were added together with water and isopropanol as solvents each 50 parts by weight. After vigorous stirring at room temperature, the mixture was gelled at about 90° C. over 1 week. The resultant wet gel was placed in acetone containing an acidic catalyst anhydrous bromic acid for aging in order to accelerate and enhance crosslinking between the particles of the wet gel. Then, the water and isopropanol as the solvents were extracted by substitution with acetone.

The resultant wet gel whose solvent has been substituted with acetone was pulverized into a powder of about 1 mm diameter and sealed in a pressure-proof vessel. The vessel was injected with liquid carbon dioxide at 20° C. and then the temperature was elevated up to 70° C. in order to substitute the solvent with carbon dioxide in the super-critical state at about 150 atmospheric pressure. After releasing the pressure from the vessel, the wet gel was dried, which gave a molded article having many pores.

The molded article thus obtained was an aerogel having a density of about 150 kg/m$^3$ and an average pore size of about 50 nm. The molded article, which was a powder, was charged in a panel-shaped vessel made of an ABS resin to form a thermal insulator. The thermal insulator showed a thermal conductivity of 0.013 kcal/mh ° C. at an average temperature of 24° C., which value was about a half or less the thermal conductivity of the known insulating material glass wool (about 0.03 kcal/mh ° C.). As such, the molded article of Example 5 demonstrated excellent insulating capacity.

EXAMPLE 6

Pieces of printed board collected during production of printed boards mainly composed of a paper-phenolic resin composition were used as the material. The cured phenolic resin thus collected was heated, gelled and aged in the same manner as in Example 1. After substitution with acetone of the solvent in the resultant wet gel, the wet gel was dried at room temperature for 1 week under natural environment and then placed in a thermostat at about 50° C. to remove acetone sufficiently, which gave a molded article with many pores.

The molded article thus obtained had a density of about 500 kg/m$^3$ and an average pore size of about 25 nm. The molded article was dried at 120° C. and then charged in a panel-shaped gas-tight vessel made of an aluminum-polyethylene terephthalate laminate film. The vessel was evacuated using a vacuum pump until a vacuum degree of 1 Torr was reached, which gave a vacuum thermal insulator. Measurement of the thermal conductivity in this vacuum thermal insulator showed a value of 0.006 kcal/mh ° C. at an average temperature of 24° C., which value was about one fifth the thermal conductivity of the known insulating material glass wool (about 0.03 kcal/mh ° C.). As such, the molded article of Example 6 demonstrated excellent insulating capacity.

As shown above, according to the method for recycling a cured phenolic resin of the present invention, a molded article with a novel additive function of insulating capacity can be obtained from a cured phenolic resin which is refractory to recycling through the procedure of the fourth step(d). As such, according to the recycling method of the present invention, a waste can be recycled efficiently. The present invention can also provide a thermal insulator exhibiting exceptional insulating capacity using a molded article obtained in the third step(c).

As discussed above, the present invention realizes efficient recycling of a cured phenolic resin which can become a massive waste into a useful material. The recycling method of the present invention can provide a molded article with an exceptional additive value and a high performance thermal insulator of the molded article.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A method for recycling a cured phenolic resin comprising the steps of:
   (a) heating a cured phenolic resin to form a thermal decomposition product having a residue of said cured phenolic resin,
   (b) separating said residue from said thermal decomposition product,
   (c) pulverizing said separated residue to obtain a carbide powder and molding said carbide powder alone or in combination with a binder into a molded article, and/or
   (d) gelling and drying said separated thermal decomposition product thereby molding it into a molded article.

2. The method for recycling a cured phenolic resin in accordance with claim 1, wherein said heating step (a) is performed in an atmosphere of a low oxygen concentration or in the presence of a solvent at a temperature of 300 to 1,000° C.

3. The method for recycling a cured phenolic resin in accordance with claim 1, wherein said pulverizing and molding step (c) is performed by charging said carbide powder alone or in combination with said binder in a gas-tight vessel and vacuum-sealing said vessel by evacuation thereby producing a vacuum thermal insulator.

4. The method for recycling a cured phenolic resin in accordance with claim 1, wherein said gelling, drying and molding step (d) is performed by adding, to said thermal decomposition product, at least a condensing agent, a condensation catalyst and a solvent to form a wet gel and drying said wet gel to evaporate said solvent thereby producing a molded article of said thermal decomposition product.

5. The method for recycling a cured phenolic resin in accordance with claim 4, wherein said molded article is charged in a gas-tight vessel followed by vacuum-sealing said vessel by evacuation thereby producing a vacuum thermal insulator.

6. The method for recycling a cured phenolic resin in accordance with claim 4, wherein said wet gel is dried by an super-critical drying technique to produce an aerogel as a molded article.

7. A vacuum thermal insulator comprising a residue contained in a thermal decomposition product of a cured phenolic resin, produced by the steps of:
   (a) heating a cured phenolic resin to form a thermal decomposition product having a residue of said cured phenolic resin,
   (b) separating said residue from said thermal decomposition product,
   (c') pulverizing said separated residue to obtain a carbide powder, charging said carbide powder alone or in combination with a binder in a gas-tight vessel, and vacuum-sealing said vessel by evacuation.

8. A molded article comprising a thermal decomposition product of a cured phenolic resin, produced by the steps of:
   (a) heating a cured phenolic resin to form a thermal decomposition product having a residue of said cured phenolic resin,
   (b) separating said thermal decomposition product from said residue,
   (d') adding, to said separated thermal decomposition product, at least a condensing agent, a condensation catalyst and a solvent to form a wet gel, and drying said wet gel to evaporate said solvent.

9. A vacuum thermal insulator produced by charging the molded article obtained in claim 8 in a gas-tight vessel and vacuum-sealing said vessel by evacuation.

* * * * *